United States Patent Office 3,475,200
Patented Oct. 28, 1969

3,475,200
PROCESS FOR COATING TEXTILE ARTICLE WITH POLYURETHANE AND THE RESULTING ARTICLE
Wilhelm Kallert, Cologne-Stammheim, and Erwin Muller, Leverkusen, Germany, assignors to Farbenfabriken Bayer Aktiengesellschaft, Leverkusen, Germany, a corporation of Germany
No Drawing. Filed Mar. 16, 1966, Ser. No. 534,668
Claims priority, application Germany, Mar. 17, 1965, F 45,547
Int. Cl. C09d 3/48; B05c 3/00
U.S. Cl. 117—94
3 Claims

ABSTRACT OF THE DISCLOSURE

A viscous paste suitable for forming a thermosetting polyurethane coating is prepared by mixing, at a temperature of from 10° C. to 60° C., one mol of an organic compound containing active hydrogen atoms which are reactive with NCO groups and having a molecular weight of from 1000 to 4000, at least 1.5 mols of a uretidine dione diisocyanate having a melting point above 100° C., and at least 0.3 mol of a chain extending agent having OH or $NH_2$ groups, said chain extending agent having a melting point above 80° C., and at least 80% of the total amount of uretidine dione diisocyanate and said chain extending agent having a grain size of less than 30μ. Coated textile articles are prepared by coating a textile fabric with the viscous paste and curing the resulting coated composition by heating at an elevated temperature.

---

This invention relates to coated textile articles of manufacture and more particularly, to polyurethane coated textile articles of manufacture.

It is known that polyhydroxyl compounds of fairly high molecular weight can be reacted with polyisocyanates and chain extenders to form high molecular weight materials with elastomeric properties. Polyesters or polyethers containing linear hydroxyl groups are preferably used as the polyhydroxyl compounds of fairly high molecular weight. Preferred polyisocyanates include, for example, toluylene diisocyanates, p-phenylene diisocyanate, napthaylene-1,5-diisocyanate or 4,4'-diphenylmethane diisocyanate, as well as diisocyanates containing further functional groups such as, for example, urea or uretdione diisocyanates. Examples of known chain extenders are water, glycols, amino alcohols, diamines and hydrazines, although alcohols and amines of higher valency have also been used. The hardness of the resulting materials and their mechanical properties differ in dependence upon the type of starting components and the quantities in which they are used. For example, the polyhydroxyl compound may be reacted with an excess of polyisocyanate, preceded or followed by the addition of the chain extender, and the liquid reaction mixture may be poured into molds in which it hardens to form a plastics material. In the case of the known liquid systems of this kind, the useful life of the mixture containing all the components varies between about one minute and one hour. It has never been possible to store such reaction mixtures over prolonged periods. It is also known to prepare hot castable polyurethane compositions by reacting together a polyhydroxyl compound such as polyester and an uretdione diisocyanate and a glycol or amine chain lengthening agent in the heat until a clear melt is obtained. This clear melt can be cast to moldings of any desired shape. The hot clear melt, however, has a varying casting time or pouring time up to one hour.

Another process comprises initially preparing a storable intermediate from polyhydroxyl compounds, a deficiency of polyisocyanates and chain extenders. This storable intermediate stage may be worked as a plastic composition by the methods normally used in the rubber industry, in which case additional amounts of a polyisocyanate are added for final vulcanization. Mixtures containing the cross-linking polyisocyanates can only be stored for very short periods, with the result that processing times of between 12 hours and, at most, four to five days must be expected.

The choice of possibilities offered is governed above all by the type of article to be manufactured and by the type of machines used to manufacture it. Basically, the resulting polyurethane elastomers are distinguished by their outstanding resistance to abrasion, solvents, fuels and lubricants, and to oxygen and ozone. In addition, the elastomers exhibit an outstanding resistance to weather and, in most cases, are much more flexible when cold than the majority of elastic materials. For this reason, elastomers of this type are being more widely used as molding materials in the automobile industry, and as structural materials in all branches of technology.

By virtue of the aforementioned properties, the urethane elastomers would be eminently suitable as fabric coverings, for example, in the manufacture of collapsible fuel containers, or as tarpaulins for lorries and tents. A problem which has yet to be solved is the application, by an economical process, of a weather-resistant and abrasion-resistant outer layer which is flexible when cold and remains unaffected by fuels and lubricants, to foldable fabric-based hoses of all kinds, for example, fire hoses and hoses used to pump fuels and fuel oils. At present, solutions of high molecular weight polyester urethanes and polyfunctional isocyanates, for example, in ethyl acetate, are being used for this purpose. In this case, very thin coatings have to be applied in numerous layers, so that the process is far from economical. In addition, the entire process has to be carried out in explosion-proof plants in which the solvent can be recovered.

It is therefore an object of this invention to provide textiles coated with polyurethane plastics. It is an object of this invention to provide an improved method of coating textiles with polyurethane plastics. It is a further object to provide textile articles of manufacture coated with a specific polyurethane plastic.

The foregoing objects and others which will become apparent from the following description are accomplished in accordance with the invention generally speaking by preparing articles of manufacture comprising a textile fabric coated with thermosetting polyurethane compositions prepared in the absence of solvents from one mol of an organic compound containing active hydrogen atoms which are reactive with NCO groups and having a molecular weight of from 1000 to 4000, at least 1.5 mols of a uretidine dione diisocyanate having a melting point above 100° C., and at least 0.3 mol of a chain extender having two OH— and/or $NH_2$— groups and a melting point above 80° C., at least 80% of the total quantity of uretidine dione diisocyanate and chain extender having a grain size of less than 30μ.

Any suitable organic compound containing active hydrogen atoms which are reactive with NCO groups such as, for example, hydroxyl polyesters, polyhydric polyalkylene ethers, polyhydric polythioethers, polyacetals and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxy methyl cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, beta-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(beta-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable chain extenders having a grain size less than 30μ may be used such as hydroquinone-dioxethylether or 1,5-dihydroxynaphthalene dioxethylether, benzidine, 4,4'-diaminodiphenylmethane and their chlorine-substituted homologues or other diamines of high melting point of the type described in German Auslegeschrift No. 1,131,398.

Any suitable uretidine dione diisocyanate may be used such as the dimer of 2,4-tolylene diisocyanate, the dimer of 2,6-tolylene diisocyanate, the dimer of 4,4'-diphenylmethane diisocyanate, the dimer of phenylene diisocyanate and the like.

The reactants are combined, for example, in Banbury mixers or solution kneaders of the type used in the rubber industry. In this case, the machine used is preferably designed in such a way that, towards the end of mixing, a vacuum can be applied so that any air bubbles which have been introduced during mixing can be removed.

In contrast to the prior art where the components are combined in the heat and reacted until a clear melt is obtained, the components are combined according to the present invention at temperatures between 10° and 60° C., preferably between 20 and 40° C., in devices referred to above. Quite unexpectedly the reactants combine to a mixture but practically without remarkable reaction between the NCO groups and the active hydrogen. A milky and turbid viscous paste is obtained which has a long life and can be stored for several days and shipped to be used, for instance, for coating textiles, especially where thick coatings are desired, e.g. for fire hoses. The composition can be simply cured by thermosetting without any additional component. To arrive at this object of a milky paste with a long storage life and without any substantial reaction but with a quick thermosetting it is essential that the components are combined between 20° and 60°, further that the uretdione diisocyanate and the chain-lengthening agent have the indicated melting points and grain size.

Whereas the polyester, polyether or polythioether is generally liquid to viscous in all cases, the uretidine dione diisocyanate and the chain extender are present in solid form on account of the melting point. It is important that no less than 80% of the total quantity of uretidine dione diisocyanate and chain extender should have a grain size of less than 30μ. If more than 1.5 mols of uretidine dione diisocyanate are used per mol of polyhydroxyl compound, a correspondingly larger amount of chain extenders exceeding the aforementioned minimum of 0.3 mol is required.

Depending on the quantitative ratio between polyisocyanates and chain extending on the one hand and polyester polyether or polythioether on the other hand, and on the viscosity of these compounds at temperatures between room temperature and about 60° C., the polyurethane composition prepared in this way has a viscous to pasty consistency. Accordingly, it may be worked either on very easily constructed calenders, or even on the much cheaper coating machines of the type commonly used in the rubber industry.

Plasticizers such as dibenzyl ether or adipic acid polyester may be added in order to modify the viscosity of the compositions. In addition, active or inactive fillers, soluble organic dyes or pigments may be added in limited quantities, providing they are compatible with polyisocyanates. Finally, organic lead salts such as the lead salt of phenyl-ethyl dithiocarbamic acid or of 3-mercapto-1,2,4-triazole, may be added to the mixture to accelerate curing. After the coating has been applied, curing of the polyurethane composition may also be accelerated by spraying or brushing on a tertiary base such as, for example, bicyclodiazaoctane. Although the polyurethane composition still contains reactive components, it may be stored at room temperature for periods ranging from at least several weeks to a few months, and for even longer periods for example, if kept in a cooled space. If, when it is being applied to fabrics, the polyurethane composition has to be made softer by heating, the processing time at 50° C. for example, may amount to several hours.

The storable, thermosetting polyurethane compositions obtained in accordance with the invention may be cured merely by heating, in which case, the required heating time will depend upon the temperature. A complete reaction takes some 90 minutes at about 110° C. and some 25 minutes at about 130° C. In general, temperatures of between 100 and 160° C. are sufficient.

The polyurethane compositions obtained in accordance with the invention may be worked by the methods commonly used in the rubber industry, and may be used in particuar for sheet-like materials and as coatings and coverings for fabric-based tarpaulins and hoses. They may be applied by the conventional methods. Fabrics may be successfully coated with the polyurethane compositions obtained in accordance with the invention, particularly for industrial purposes. Heavy-duty hoses and fire hoses are mentioned as examples.

The invention is further illustrated but not limited by the following examples in which parts are by weight unless otherwise specified.

EXAMPLE I

About 7837 parts of a hexanediol/adipic acid polyester (OH number 134), which was prepared by thermal esterification, are reacted with about 878 parts of a 65:35 isomer mixture of 2,4- and 2,6-toluylene diisocyanate, to form a polyester urethane (OH number 56). About 296 parts of dimeric 2,4-toluylene diisocyanate and about 44 parts of hydroquinone dioxethylether and about 100 parts of dibenzyl ether are added to about 1000 parts of the polyester urethane at about 50° C. in a solution kneader. A viscous, milky paste which does not contain any coarse particles is formed after 45 minutes. Any air bubbles in the paste are removed by the brief application of a vacuum of about 50 mm. Hg.

A polyester fabric with a tensile strength of about 400 kg/5 cm. is so thinly coated with the warm paste using a coating knife that the outermost fibers are just covered. Heating of the coated fabric to about 120° C. over a period of about 65 minutes produces a highly elastic, transparent coating which can only be removed by destroying the complete fabric. No odor is given off during heating.

The resulting coating has an outstanding resistance both to abrasion and to weathering. In the flex-cracking test carried out on Feuerland's machine in accordance with DIN 53359, the coating remained undamaged after being flexed 100,000 times at room temperature and also at —30° C.

Part of the resulting polyurethane composition is stored at room temperature in a sealed, damp-proof container. After an interval of two months, the composition may be processed in exactly the same way and with equally good results by heating to about 55° C.

The viscosity of the mixture remains unchanged for over two hours at the processing temperature of about 50 to 55° C. Accordingly, the composition may be stored in a fairly large container for continuously coating considerable lengths of fabric-based hose or continuous length of fabrics.

EXAMPLE 2

67 parts by weight of a polyester prepared from equally molar amounts of 1,6-hexane diol, 2,2-dimethyl-1,3-propane diol and adipic acid and having the OH number of 58, 33 parts by weight of a polyester (OH number 132) prepared from 1,6-hexane diol and adipic acid which has been prereacted with 1 mol of toluylene diisocyanate per 2 mols of that polyester, 3 parts by weight of hydroquinone dioxethyl ether, 3 parts by weight of silicic earth and 2 parts by weight of sodium monochloro acetate which is milled to a particle size of about 5 to 20μ are made into a paste at 30 to 35° in a kneader to give a smooth viscous paste. The viscosity is decreased by adding a solution of 3 parts by weight of a polycarbodiimide in 20 parts by weight of methylene chloride to an extent that the mixture with an usual doctor blade gives a coating of 0.2 mm. in thickness onto a polyamide fabric in one step. Passing fabrics thus coated through an oven at 135° the coating is no longer sticky after four minutes and of sufficient elasticity that the coated fabric can be wound onto a roll. After further storage at room temperature for eight days the coating material reaches its final quality and exhibits a substantially transparent and extremely abrasion resistant coating which shows resistance against cutting and which is also resistant against solvents.

If the procedure is as above, but omitting the 2 parts by weight of sodium monochloro acetate, a coating with equally good mechanical properties can be obtained, but the coating needs a thermic after-treatment in the oven for at least 15 minutes. Furthermore temperatures of at most 120° C. are allowed, because otherwise blisters occur in the coating.

Although the invention has been described in considerable detail in the foregoing for the purpose of illustration, it is to be understood that such detail is solely for this purpose and that variations can be made by those skilled in the art without departing from the spirit and scope of the invention.

What is claimed is:

1. A process for coating a textile fabric with a thermosetting polyurethane comprising applying a substantially unreacted viscous paste for forming a thermosetting polyurethane coating comprising one mol of an organic compound containing active hydrogen atoms which are reactive with NCO groups and having a molecular weight of from 1000 to 4000, at least 1.5 mols of a uretidine dione diisocyanate having a melting point above 100° C., and at least 0.3 mol of a chain extending agent having OH or $NH_2$ groups, said chain extending agent having a melting point above 80° C., at least 80% of the total amount of uretidine dione diisocyanate and said chain extender having a grain size of less than 30μ to a textile fabric and curing the resulting composition by heating at an elevated temperature of from 100° C. to 160° C.

2. A coated textile fabric produced by the process of claim 1.

3. The coated textile fabric of claim 2 wherein said textile fabric is a fire hose.

References Cited

UNITED STATES PATENTS

| | | | |
|---|---|---|---|
| 2,879,803 | 3/1959 | Francois | 117—94 X |
| 2,901,467 | 8/1959 | Croco | 117—161 X |
| 2,916,472 | 12/1958 | Nischk et al. | 260—77.5 X |
| 3,099,642 | 7/1962 | Holtschmidt et al. | 260—75 |
| 3,248,370 | 4/1966 | Reischl et al. | 260—75 |
| 3,255,030 | 6/1966 | Storti | 117—161 X |
| 3,293,203 | 12/1966 | Paulus | 117—161 X |
| 3,180,883 | 4/1965 | Case | 117—161 X |
| 3,289,703 | 12/1966 | Brown | 156—79 |
| 3,375,224 | 3/1968 | Cordier et al. | 117—161 X |
| 3,385,829 | 5/1968 | Heydkamp et al. | 117—161 X |

FOREIGN PATENTS 360,364 4/1962 Switzerland.

WILLIAM D. MARTIN, Primary Examiner

M. R. P. PERRONE, JR., Assistant Examiner

U.S. Cl. X.R.

117—161; 138—137; 260—77.5, 75